May 19, 1925.
G. C. STEBBINS
HANDLE FOR BATTERY BOXES
Filed April 27, 1922
1,537,970
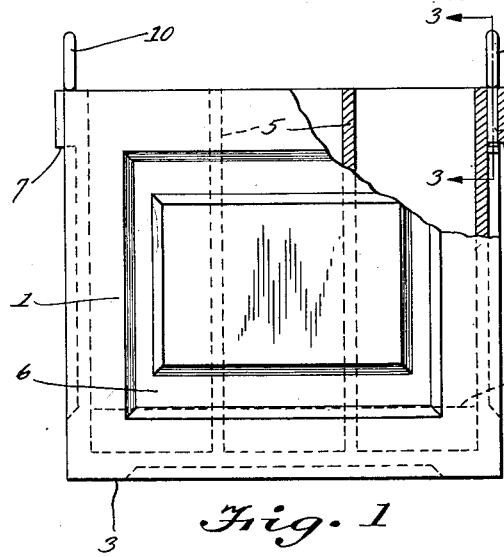
Fig. 1
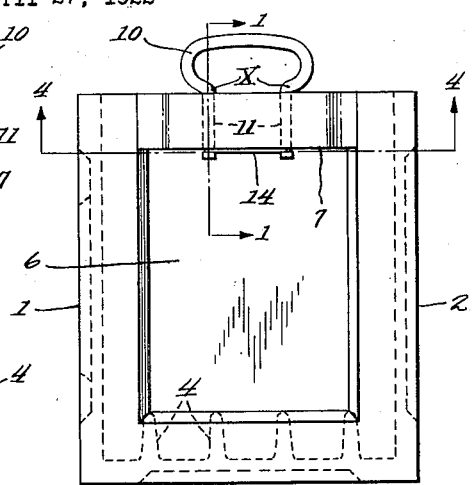
Fig. 2
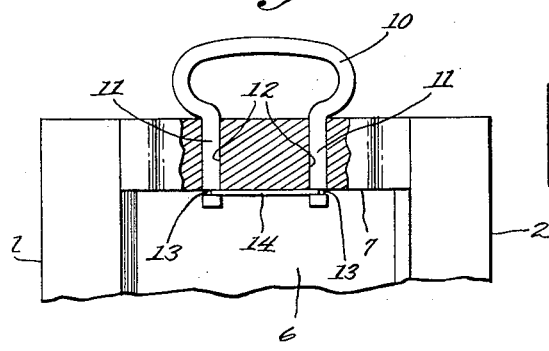
Fig. 3
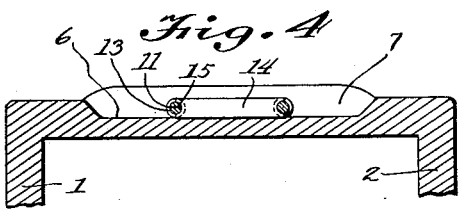
Fig. 4
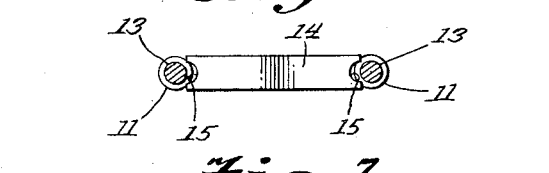
Fig. 6
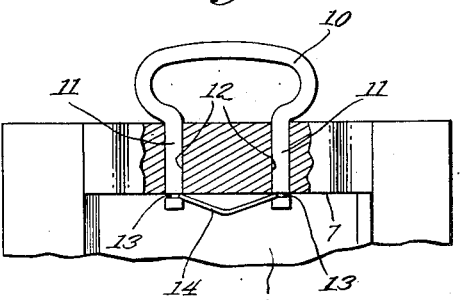
Fig. 5
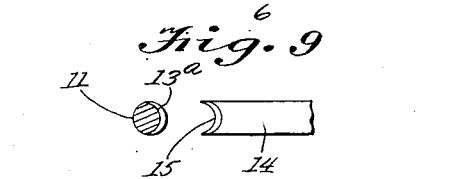
Fig. 7
Fig. 8
Fig. 9
Inventor
George C. Stebbins
By Brockett & Hyde
Atty.

Patented May 19, 1925.

1,537,970

UNITED STATES PATENT OFFICE.

GEORGE C. STEBBINS, OF ASHTABULA, OHIO.

HANDLE FOR BATTERY BOXES.

Application filed April 27, 1922. Serial No. 556,912.

*To all whom it may concern:*

Be it known that I, GEORGE C. STEBBINS, a citizen of the United States, residing at Ashtabula, in the county of Ashtabula and State of Ohio, have invented certain new and useful Improvements in Handles for Battery Boxes, of which the following is a specification.

This invention relates to handles for battery boxes.

The object of the invention is to provide an improved battery box handle which is of simple construction, and which can be easily and cheaply assembled with the box and is readily replaceable if broken or eaten through by the acid.

In the drawings, Fig. 1 is a front elevation partly broken out and in section on the line 1—1, Fig. 2; Fig. 2 is an end elevation; Fig. 3 is a detail sectional elevation on a larger scale on the line 3—3, Fig. 1; Fig. 4 is a detail section on a larger scale on the line 4—4, Fig. 2; Fig. 5 is a view similar to Fig. 3 and showing the assembling or securing step; Figs. 6 and 7 are respectively plan and edge views of the securing bar before the same is locked in place; and Figs. 8 and 9 are detail views illustrating a modification.

While the invention is capable of use in battery boxes of any kind, such as those made of wood or other materials, it is particularly suitable for one piece battery boxes made of glass, rubber or a rubber composition, the drawings showing for purposes of illustration a rubber composition box. Said box is cast or molded in one piece including side walls 1 and 2, and a bottom 3 from which project upwardly the ribs 4 to support the battery plates, and which box is divided into three cells by cross partitions 5. The shorter side walls are the ones to which the handles are usually secured. Said walls, and indeed the longer side walls also, are paneled by being provided on their outer surfaces with recesses 6, forming a relatively thin wall at said panels with thicker or heavier portions at the corners. Also, as shown in Fig. 4, the upper portion of the short walls is preferably, but not necessarily, bulged outwardly to thereby increase the width of the shoulder or abutment 7 at the upper portion of the panel, this shoulder or abutment forming a seat for the handle securing device, as will later appear.

Boxes of this kind, and indeed wooden or other boxes also, are provided with handles for convenience in manipulation. Metal handles are usually objectionable because they are difficult to replace when broken or when the acids of the battery chances to corrode and weaken them. In the present box the handles, one at each short side of the box, comprises a metal bar bent to form a looped grasping portion 10 and two parallel shank portions 11 which are passed through openings 12 formed in the upper horizontal rib or projection of the box wall. The width of this rib or projection is such that the shank portions of the handle extend downwardly clear through said rib and are exposed beneath the shoulder or abutment 7 of the same within the end panels, as shown in Fig. 2. This arrangement enables securing means to be connected to the exposed ends of the shanks for fastening the handle in place. Also, if the upper portions of the handles break or are corroded through at the points marked X, Fig. 2, as is frequently the case, the remaining shank portions can be driven down through the holes and new handles easily put in place.

The handle securing means may be of any suitable form. In the drawings each shank is provided with a suitable recess for this purpose. In Figs. 1 to 4 said recesses are formed as annular grooves 13 while in Figs. 8 and 9 the recesses 13ª are merely nicks or indentations in the sides of the shanks. The securing device itself is a small soft steel bar or strap 14 shown in detail in Figs. 6 and 7 and provided with curved recesses 15 in its ends. Said strap is initially formed with a bend or groove therein, as shown in Fig. 7 enabling it to be introduced into position between the exposed ends of the shanks after the handle is pushed down to its seat with the curved gripping portion limiting its position. With any suitable tool or implement the soft steel bar is then straightened by pressure, thereby bending it to the form shown in Fig. 2, causing its recessed end portions to enter the recesses or indentations of the shanks and permanently confine the handle in place. No solder or lead is necessary and a broken handle can be readily renewed as will be obvious.

What I claim is:

A battery box having one of its walls provided with an outward projection along its upper portion, a handle having shank portions extending through said projection and exposed outside of the box beneath the same, said shank portions being provided with side recesses, and a soft metal bar bent to enable it to be introduced between said shank portions and permanently interlocked with the recesses thereof by straightening said bar.

In testimony whereof I hereby affix my signature.

GEORGE C. STEBBINS.